US006466332B1

(12) United States Patent
Fukasawa

(10) Patent No.: US 6,466,332 B1
(45) Date of Patent: *Oct. 15, 2002

(54) BLACK COLOR GENERATION AMOUNT DETERMINING METHOD IN BLACK PRINTING, A BLACK COLOR GENERATION AMOUNT DETERMINING APPARATUS IN BLACK PRINTING, A MEDIA HAVING RECORDED THEREON A BLACK COLOR GENERATION AMOUNT DETERMINING PROGRAM IN BLACK PRINTING

(75) Inventor: Kenji Fukasawa, Nagano (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,183

(22) Filed: Jan. 21, 1998

(30) Foreign Application Priority Data

Oct. 8, 1997 (JP) .............................................. 9-275682

(51) Int. Cl.[7] .............................................. G06F 13/00
(52) U.S. Cl. ........................ 358/1.9; 515/518; 515/529
(58) Field of Search .......................... 395/109; 358/515, 358/529, 530, 1.9, 448, 444, 518

(56) References Cited

U.S. PATENT DOCUMENTS

| | | | | |
|---|---|---|---|---|
| 5,398,124 A | * | 3/1995 | Hirota | 358/530 |
| 5,461,440 A | * | 10/1995 | Toyoda et al. | 358/448 |
| 5,530,656 A | * | 6/1996 | Six | 101/365 |
| 5,594,839 A | * | 1/1997 | Shu | 358/1.9 |

FOREIGN PATENT DOCUMENTS

| | | | | |
|---|---|---|---|---|
| JP | 5-292306 | 11/1993 | | H04N/1/40 |
| JP | 7-87346 | 3/1995 | | H04N/1/60 |
| JP | 7-121074 | 12/1995 | | H04N/1/60 |

* cited by examiner

*Primary Examiner*—Mark Wallerson
(74) *Attorney, Agent, or Firm*—Sughrue Mion, PLLC

(57) ABSTRACT

In order to perform black printing in a color space for printing approximately equivalent element colors such as CMY, a CPU system multiplies an undercolor amount CMYmin which is a common minimum component in the element colors by a predetermined generation ratio BGR to generate a black color component. In this case, the generation ratio BGR of the black color component is made smaller as the data before conversion becomes brighter, whereby a generation amount Kout of the black color component is small for the brighter color if the undercolor amount CMYmin is the same. When the printing operation is performed with reference to a color conversion table for printing obtained in this way, a dot corresponding to the black color component is unremarkable.

25 Claims, 14 Drawing Sheets

| R | G | B | Cout | Mout | Yout | Kout |
|---|---|---|------|------|------|------|
|   |   |   |      |      |      |      |

FIG. 8

BLACK COLOR GENERATION AMOUNT DETERMINING METHOD IN BLACK PRINTING, A BLACK COLOR GENERATION AMOUNT DETERMINING APPARATUS IN BLACK PRINTING, A MEDIA HAVING RECORDED THEREON A BLACK COLOR GENERATION AMOUNT DETERMINING PROGRAM IN BLACK PRINTING

BACKGROUND OF THE INVENTION

1. Field of the Invention

The present invention relates to a black color generation amount determining method in black printing, a black color generation amount determining apparatus in black printing and a media having recorded thereon a black color generation amount determining program in black printing.

2. Description of the Prior Arts

Various methods have conventionally been proposed for determining a black color component in performing black printing, one of which is proposed in "Theory and Practice of Black Printer" at Electrostatic Society Magazine, Vol. 3, No. 3, pp.67 to 75.

The basic idea of black printing is such that an undercolor amount which is a common minimum component is obtained based upon tone data of so-called CMY (cyan, magenta, yellow) to calculate K (black) component by multiplying the undercolor amount by a constant number called a black generation ratio (BGR), while a predetermined ratio (UCR ratio) is multiplied to the K component in order to replace the CMY component with the K component for attaining decreased amount.

On the other hand, Japanese Laid-Open Patent Application No. HEI 7-87347 discloses a method for determining an UCR ratio based upon chroma upon performing such black printing.

Black printing is put to practical use in a color printer connected to a computer, wherein K dot is marked with CMY dot.

The principal objective in the above-mentioned conventional method for determining a black color component is to prevent color difference from being generated. A remarkableness of dot is liable to become a problem above the color difference for a device having a relatively large dot diameter such as a color printer. On the other hand, there may frequently be the case where colors are different from one another even if they have the same undercolor amount. It has been known that the remarkableness of each K dot is different, when these different colors are printed by the color printer.

SUMMARY OF THE INVENTION

An object of the present invention is to provide a black color generation amount determining method in black printing capable of making K dot unremarkable including a color printer.

The black color generation amount determining method in black printing according to the present invention is constructed such that, upon generating a black color component in order to perform black printing in a color space for printing comprising a plurality of approximately equivalent element colors, the black color component is caused to be generated to have a predetermined relationship with respect to a gray component in the plurality of element colors, and that the brighter a color is, the more the generation amount decreases.

In the present invention having the aforesaid construction, the black color component is caused to be generated to have a predetermined relationship with respect to the gray component in the plurality of element colors upon performing black printing in the color space for printing comprising the plurality of approximately equivalent element colors. The generation amount of the black color component varies not only in accordance with the gray component, but also in relation to brightness of data before conversion, that is, the brighter the data before conversion is, the less the black color component generates. Accordingly, the generation amount of the black color component is decreased in the brighter color even if the gray component is the same, thereby making the black color component unremarkable.

Therefore, the present invention can provide the black color generation amount determining method capable of making dot unremarkable, since the present invention places great importance on not only the viewpoint of the color difference but also the viewpoint of the remarkableness of dot in black printing to control the generation amount of the black color component with respect to a bright color.

Various deciding methods can be adopted to the gray component which is the basis for generating the black color component. Another object of the present invention is to provide a more specific deciding method of the gray component.

In the black color amount determining method in black printing according to the present invention, the gray component is decided based upon an undercolor amount which is a common minimum component in the plurality of element colors.

In the present invention having the aforesaid construction, the gray component is decided based upon the obtained undercolor amount which is the common minimum component in the plurality of element colors. The undercolor amount in a narrow sense corresponds to minimum tone data if, for example, the plurality of element colors are expressed by CMY and the undercolor amount is afforded as the tone data representing the densities of CMY. However, the undercolor amount is not limited to the one in a narrow sense. For example, there has been known a method as an undercolor removal in which the undercolor amount obtained in this way is simply replaced with the black color component for subtracting the component value of each element color by the replaced value. In this case, the element color of the minimum component value is originally not utilized at all. However, it has been known that chroma is decreased in the aforesaid method. Therefore, a method of an undercolor addition may actually be performed to add a predetermined component amount to each of the element colors after subtracting the undercolor amount. Accordingly, an experiential compensation may be added to the undercolor amount, so that the undercolor amount which is the common minimum component in the plurality of element colors is merely used as the basis of the gray component. The present invention includes the undercolor amount suitably increased or decreased.

In this way, the present invention can provide the black color generating amount determining method capable of deciding the gray component in a relatively simple manner.

It should be noted that the method of the undercolor removal or undercolor addition may be adopted in the present invention. In this case, the undercolor removal amount can be varied related to unfixed generation amount of the black color component. For example, upon generating the black color component while determining the undercolor removal amount for subtracting the component amount of each element color based upon the undercolor amount, the undercolor removal amount may be determined to be great as the generation amount of the black color component increases. In such a construction, the undercolor removal amount varies with the variation of the actual generation ratio of the black color component since the generation ratio of the black color component varies in accordance with brightness, whereby the balance as the undercolor amount is maintained.

Brightness of a color is the basis for determining the generation amount of the black color component. The tendency may show that the brighter the color is, the more the generation amount decreases. Therefore, the basis can include the other factors than brightness.

Therefore, further object of the present invention is to provide a black color generation amount determining method in black printing capable of having a basis including other factors than brightness.

The black color generation amount determining method in black printing according to the present invention has the construction for deciding by adding chroma as a guideline of bright color to brightness.

In the present invention having such a construction, the greater chroma is, the greater the index of brightness is by adding chroma to the index of brightness, with the result that the generation amount decreases. On the other hand, the smaller chroma is, the smaller the index of brightness becomes, so that the generation amount increases. When this construction is adopted, the generation amount of the black color component increases in the portion of nearly gray having low chroma, while it decreases in a bright portion.

Therefore, according to the present invention, the generation amount of the black color component increases in the portion of nearly gray having low chroma, so that the gray balance is easy to be kept, while the generation amount of the black color component is controlled in the bright area by increasing the index of brightness, so that the black dot becomes unremarkable.

When the generation amount of the black color component is calculated based upon brightness, it is necessary to obtain brightness as the assumption. If the objective color space possesses a parameter of brightness as the direct element, this parameter can be used. However, on the assumption of the color space for printing comprising a plurality of approximately equivalent element colors, the parameter of brightness as the direct element is not be provided.

Therefore, further object of the present invention is to provide a suitable black color generation amount determining method in black printing adopting to the case of not providing a parameter of brightness as the direct element.

The black color generation amount determining method in black printing according to the present invention obtains brightness of color with reference to a table on which a corresponding relationship is recorded in advance.

In the present invention having such a construction, the table is prepared on which each brightness of each color is recorded, whereby the generation amount of the black color component is determined as described above by obtaining brightness with reference to the table.

Accordingly, brightness can accurately and simply be obtained by referring the table for brightness of color.

Although the table referred to in this case may be the one capable of referring at least for brightness, the table may be referred to for the other parameters such as chroma in addition to brightness. This table may always be kept, or may be present only when the generation amount of the black color component is determined. Further, this table may be provided with a corresponding relationship among all colors of the data before conversion, or may be provided with a corresponding relationship for some colors. The corresponding relationship may be calculated by an interpolation calculation with respect to colors whose corresponding relationship is not recorded on the table. Further, accessing an external data base only in case of necessity is naturally included.

The Neugebauer equation is well-known for a reproducibility of colors by printing. Although it is generally difficult to realize due to a large calculation amount, the reproducibility of color can accurately be simulated if the calculation is possible.

Accordingly, further object of the present invention is to provide a black color generation amount determining method in black printing suitable for high calculation ability.

The black color generation amount determining method in black printing according to the present invention has the construction such that three stimulus values are obtained based upon the Neugebauer equation, whereupon brightness of color is obtained by performing a linear conversion of the three stimulus values.

In the present invention having such a construction, so-called three stimulus values can be obtained based upon the Neugebauer equation even if high calculation ability is required, whereby brightness can be obtained by the linear conversion if the three stimulus values are obtained.

Therefore, brightness can be obtained only by the calculation according to the present invention.

Black printing is performed in a printing stage. However, the image processing or the like is not always executed in the color space in the printing stage. Accordingly, an operation is frequently performed for color-converting the color space in the image processing into the color space in the printing stage.

Therefore, further object of the present invention is to provide a black color generating amount determining method in black printing suitably used upon the operation of the color-conversion from the color space in the image processing into the color space in the printing stage.

The black color generating amount determining method in black printing according to the present invention has the construction such that the generation amount of the black color component in the color space for printing is determined based upon the color data comprising a coordinate value of the color space different from that for printing.

In the present invention having such a construction, when the color space for printing is CMY, the color data represented by the coordinate value from the color space different from that of CMY, such as RGB (red, green, blue) or L*a*b* is used as a parameter to determine the generation amount of the black color component in the color space for printing including the black color component.

Therefore, most preferable generation amount of the black color component can be determined based upon the color data of the color space different from that for printing according to the present invention.

Although it is possible in this way to execute the determination of the generation amount of the black color component every time the printing operation is performed, it is enough to execute once the determination of the generation amount of the black color component to determine the black color component with respect to each color.

Therefore, further object of the present invention is to provide a black color generating amount determining method in black printing capable of decreasing the number of the determining operation of the black color component.

The black color generating amount determining method in black printing is utilized upon determining the black color component of the color conversion table used for color-converting from the color space different from that for printing into the color space for printing.

In the present invention having such a construction, once such a color conversion table is formed, the same color conversion table may be referred to for performing the color conversion upon the printing operation from the other color space.

Therefore, according to the present invention, the black color component whose dot is unremarkable is used for forming the color conversion table, so that the same table can be reused to decrease the operation number.

The black color generation amount determining method includes the case wherein the method is independently executed in an apparatus or the case wherein the method is incorporated in other apparatus to be executed as one function of the apparatus. In other words, the concept of the invention includes various embodiments. Accordingly, it is possible to be realized not only in a hardware but also in a software.

Therefore, further object of the present invention is to provide a black color generation amount determining apparatus as a hardware for realizing the concept of the present invention as the hardware.

The black color generation amount determining apparatus according to the present invention is the one for determining the generation amount of the black color component in order to perform black printing in a color space for printing comprising a plurality of approximately equivalent element colors, wherein the black color component is caused to be generated to have a predetermined relationship with respect to a gray component in the plurality of element colors, and the brighter a color is, the more the generation amount decreases.

Therefore, the present invention is capable of providing the black color generation amount determining apparatus affording the same effect.

Further, in case where the embodying example of the concept of the invention is a software for determining the generation amount of the black color component, it is ought to say that the present invention is naturally present on a recording media having the software recorded thereon to be utilized.

Accordingly, further object of the present invention is to provide a software for determining the generation amount of the black color component.

A media having recorded thereon the black color generation amount determining program according to the present invention is the one having recorded thereon the black color generation amount determining program for determining by a computer the generation amount of the black color component in order to perform black printing in a color space for printing comprising a plurality of approximately equivalent element colors, wherein the black color component is caused to be generated to have a predetermined relationship with respect to a gray component in the plurality of element colors, and the brighter a color is, the more the generation amount decreases.

Therefore, the present invention is capable of providing the media having recorded thereon the black color generation amount determining program in black printing.

The recording media may be a semiconductor chip, a magnetic recording media or optically magnetic recording media. This concept can be adopted to any recording media developed from now on in the same manner. There is no inquiring that the same concept is adopted to a reproducing stage such as a primary reproduction product or secondary reproduction product. In addition, the present invention is similarly utilized in the case of using a communication line as a supplying method.

Additionally, the concept of the invention is not so different when the invention is realized in partly the software and partly the hardware. Moreover, it may include an embodiment in which a portion of the program of the invention is recorded on the recording media which is read as the need arises.

The effect of rendering dot unremarkable as described above is demonstrated upon printing based upon the black color component determined in this way, whereby it should be said that the concept of the invention is effective for the color conversion table for printing used upon printing as well as is effective for the method or the apparatus for forming the color conversion table for printing. In this case, various types can be adopted for the format as the color conversion table or referring method. It is unnecessary for the table to always be usably developed. The table may be developed only when used. Further, the table may be distributed in a common condition and rendered suitable corresponding to an adopting system when installed. Additionally, although there may be the case where the color conversion table for printing is not always used in the printing stage, it is possible in this case to vary the generation amount of the black color component by using brightness as the index.

BRIEF DESCRIPTION OF THE DRAWINGS

FIG. 8 is a view showing a constitution of a color conversion table for printing.

DESCRIPTION OF THE PREFERRED EMBODIMENT

The present invention will be explained with reference to the drawings.

Figure 1:
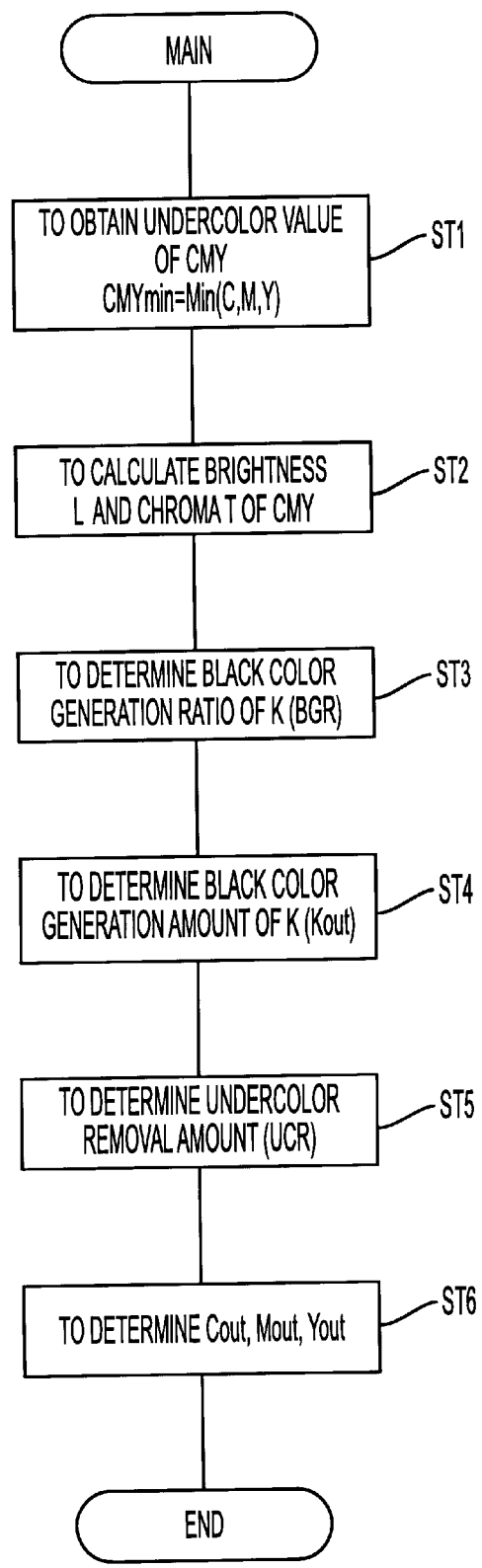
FIG. 1 is a flowchart showing a procedure upon forming a color conversion table for printing by adopting a black color generation amount determining method according to one embodiment of the present invention.

FIG. 1 is a flowchart showing a schematic procedure upon forming a color conversion table for printing by adopting a black color generation amount determining method according to one embodiment of the present invention.

Firstly, an undercolor value CMYmin is obtained in a first step ST1 based upon respective color components CMY. The undercolor value has the same meaning as an undercolor amount, which represents a common minimum component when respective color components are represented as tone data at coordinate value in a color space for printing comprising a plurality of approximately equivalent element colors such as CMY. When the respective color components are 0 to 255, comparing the case where C:200, M:200, Y:50 to the case where C: 50, M: 50, Y:200, both of the undercolor value CMYmin itself are 50, while a generation ratio of K (BGR) varies as described later.

Brightness L and chroma T are obtained at a second step ST2. Although the brightness L is the minimum necessary value, the chroma T is also utilized in order to make it easy to keep a gray balance. When a data before conversion is represented as CMY, the brightness L and the chroma T cannot be obtained by a simple calculation.

A first method for obtaining the brightness L and the chroma T is the one wherein the brightness L and the chroma T are subject to colorimetry to be obtained in advance, while the obtained values are recorded in a table as a three-dimensional calorimetric data, whereby this table is referenced. In this case, it is impossible from the viewpoint of the work to perform colorimetry with respect to all of the colors (approximately 16,700,000 colors), so that colorimetry is performed with respect to some colors, while an interpolation calculation is executed for those of the other colors to be obtained.

Figure 2C:
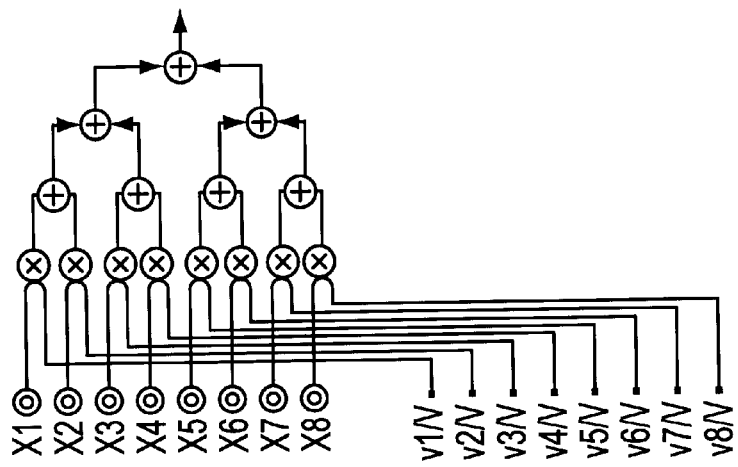
FIG. 2 is a schematic explanatory view showing a eight-point interpolation calculation.
Figure 2A:
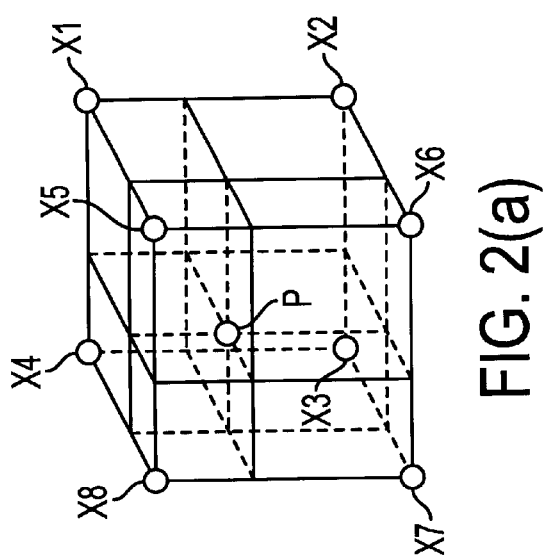
Figure 2B:
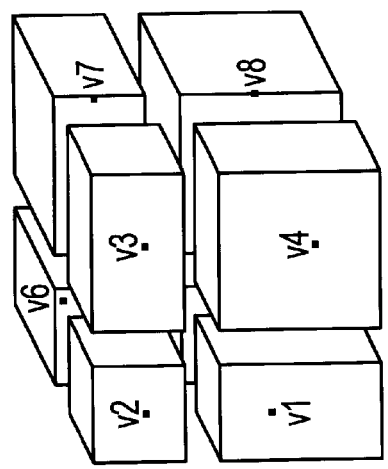

An eight-point interpolation shown in FIGS. 2(*a*) to (*c*) is usable as one example of the interpolation calculation. In the interpolation calculation of this eight-point interpolation, with respect to a color at a coordinate at CMY coordinate axis, a corresponding relationship of a lattice point which encircles the coordinates is utilized to obtain the corresponding relationship of the coordinates via the linear interpolation calculation. It is noted that the color space of the data before conversion is divided into lattice-like unit cube to obtain the brightness L and the chroma T at the lattice point by performing colorimetry.

When the conversion value at the vertex Pk of the order of k of a cube is designated as Xk and the volume of the cube is designated as V, the corresponding value Pc at an internal point P of the cube can be interpolated by weighing due to the ratio of the volume Vk of eight small rectangular parallel-epipeds which are divided at P point as shown in the figure.

$$Pc = \sum_{k=1}^{8} (Vk/V) \cdot Xk$$

The conversion value Xk at this time is the brightness L or the chroma T at each lattice point, and the obtained corresponding value Pc is the brightness L or the chroma T at the internal point P.

Another method can be utilized which is adapted to color screen dot model for solving the Neugebauer equation.

Figure 3:
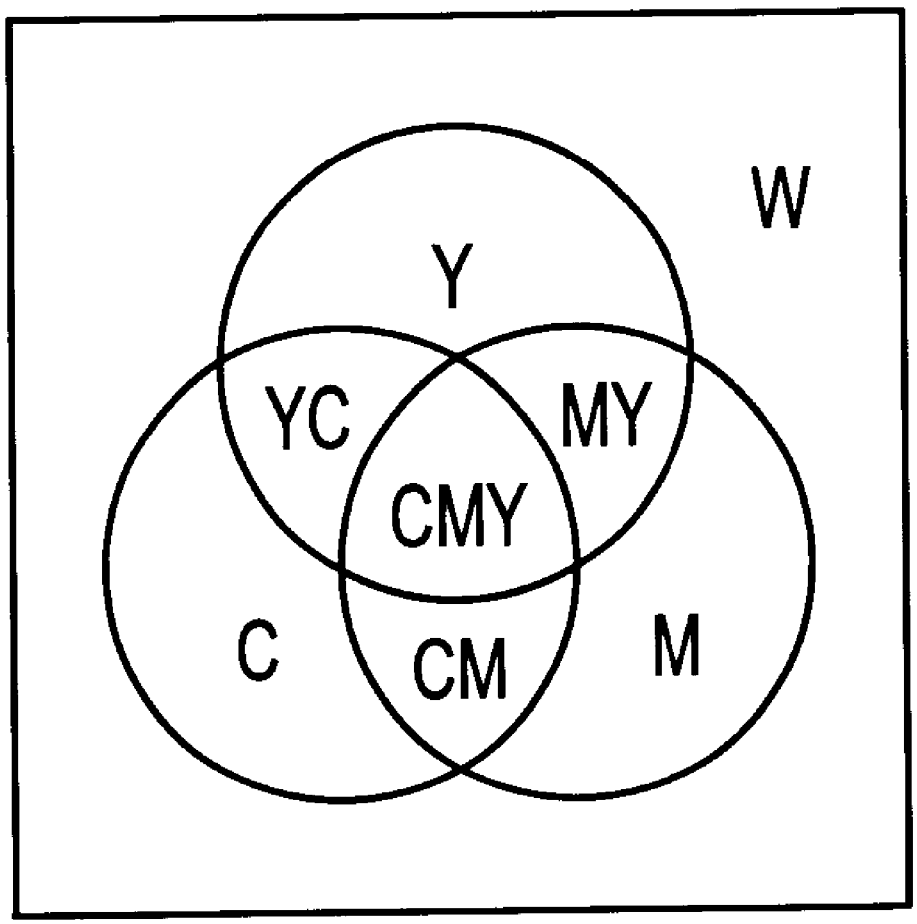
FIG. 3 is a schematic explanatory view showing a color screen dot model.

In the case of printing dots on a paper with color inks of CMY, the overlapping state of each color on the paper is constituted of eight color areas of a first color CMY, a second color CM, MY, YC, a third color CMY and a white color W as shown in FIG. 3. When each areal ratio of each color ink is represented by f(C), f(M) and f(Y) as well as these color inks randomly overlap with one another on the paper, each of the areal ratio of the above-mentioned eight colors are W→(1−f(C))·(1−f(M))·(1−f(Y))
C→f(C)·(1−f(M))·(1−f(Y))
M→(1−f(C))·f(M)·(1−f(Y))
Y→(1−f(C))·(1−f(M))·f(Y)
CM→f(C)·f(M)·(1−f(Y))
MY→(1−f(C))·f(M)·f(Y)
YC→f(C)·(1−f(M))·f(Y)
CMY→f(C)·f(M)·f(Y)

Further, when each of three stimulus values of the above-mentioned eight colors is denoted as follows, W→(Xw, Yw,Zw)
C→(Xc, Yc,Zc)
M→(Xm,Ym,Zm)
y→(Xy,Yy,Zy)
CM→(Xcm, Ycm,Zcm)
MY→(Xmy, Ymy,Zmy)
YC→(Xyc, Yyc, Zyc)
CMY→(Xcmy, Ycmy, Zcmy)

the three stimulus values X, Y, Z with respect to the input CMY can be represented as follows.

$$\begin{pmatrix} X \\ Y \\ Z \end{pmatrix} = \begin{pmatrix} Xw & Xc & Xm & Xy & Xcm & Xmy & Xmc & Xcmy \\ Yw & Yc & Ym & Yy & Ycm & Ymy & Ymc & Ycmy \\ Zw & Zc & Zm & Zy & Zcm & Zmy & Zmc & Zcmy \end{pmatrix} \times$$

$$\begin{pmatrix} (1-f(C))\cdot(1-f(M))\cdot(1-f(Y)) \\ f(C)\cdot(1-f(M))\cdot(1-f(Y)) \\ (1-f(C))\cdot f(M)\cdot(1-f(f)) \\ (1-f(C))\cdot(1-f(M))\cdot f(Y) \\ f(C)\cdot f(M)\cdot(1-f(Y)) \\ (1-f(C))\cdot f(M)\cdot f(Y) \\ f(C)\cdot(1-f(M))\cdot f(Y) \\ f(C)\cdot f(M)\cdot f(Y) \end{pmatrix}$$

The conversion of a color space L*a*b* from the three stimulus values X, Y, Z can be realized by a linear calculation.

As for a brightness index L*, the following formula is established.

$$L^* = 116\left(\frac{Y}{Yn}\right)^{\frac{1}{3}} - 16$$

When $\left(\frac{Y}{Yn}\right) > 0.008856$ $$L^* = 903.29\left(\frac{Y}{Yn}\right)$$

When $\left(\frac{Y}{Yn}\right) \leq 0.008856$

In the formula, Y represents the three stimulus values at the print paper surface and Yn represents the three stimulus values at an entire diffusion reflection surface.

Moreover, as for a chromaticness index a*b*, the following formula is established.

$$a^* = 500\left[\left(\frac{X}{Xn}\right)^{\frac{1}{3}} - \left(\frac{Y}{Yn}\right)^{\frac{1}{3}}\right]$$

$$b^* = 200\left[\left(\frac{Y}{Yn}\right)^{\frac{1}{3}} - \left(\frac{Z}{Zn}\right)^{\frac{1}{3}}\right]$$

When $\left(\frac{X}{Xn}\right) > 0.008856$

When $\left(\frac{Y}{Yn}\right) > 0.008856$

When $\left(\frac{Z}{Zn}\right) > 0.008856$

In the formula, X, Y, Z represent the three stimulus values at the print paper surface and Xn, Yn, Zn represent the three stimulus values at an entire diffusion reflection surface. Further, in case where there is a value 0.008856 or below among X/Xn, Y/Yn, Z/Zn, the term of the corresponding cubic root is replaced as follows.

$$7.787\left(\frac{X}{Xn}\right) + \frac{16}{116}$$

$$7.787\left(\frac{Y}{Yn}\right) + \frac{16}{116}$$

$$7.787\left(\frac{Z}{Zn}\right) + \frac{16}{116}$$

The chroma T can be obtained from the chromaticness index a*b* by the following formula by utilizing the brightness index L* as the brightness L.

$$T = SQRT\{(a^*)^2 + (b^*)^2\}$$

At a third step ST3, a generation ratio BGR of the black color component is obtained by using the obtained brightness L and the chroma T.

Firstly, the embodiment of the present invention utilizes the following conversion formula, not simply coincide the brightness L with the index of brightness LS.

$$LS = L + T/2$$

Moreover, in case where the generation ration BGR becomes the maximum [1] when the index of brightness LS is the same as or below the threshold value E as well as the BGR becomes the minimum [0] when the LS is the same as or above the threshold value S, and where the curve upon gradually decreasing the generation ratio BGR between these values is represented by a power function, the generation ratio BGR is represented as follows every case based upon the index of brightness LS.

When LS>S, $$BGR = 0.0 \ldots (1)$$

When $E \leq LS \leq S$, $$BGR = pow((S-LS)/(S-E), slope) \ldots (2)$$

when LS<E, $$BGR = 1.0 \ldots (3)$$

Figure 4:
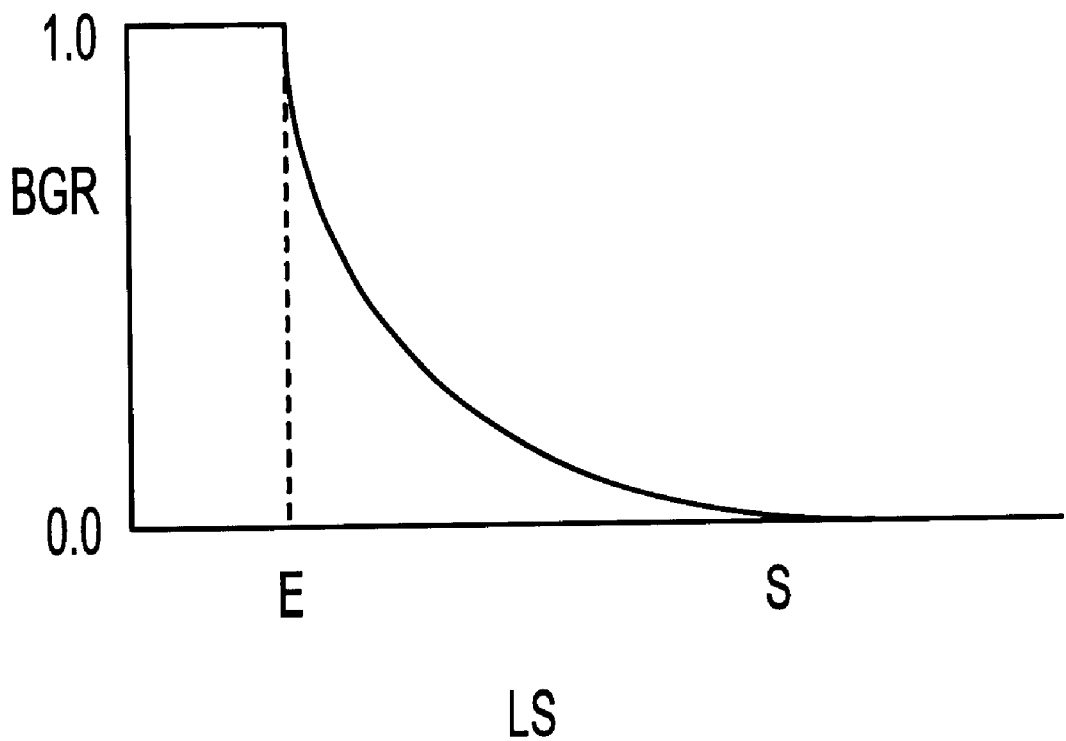
FIG. 4 is a graph showing a relationship between brightness index LS and a generation ratio of K as BGR.
Figure 5:
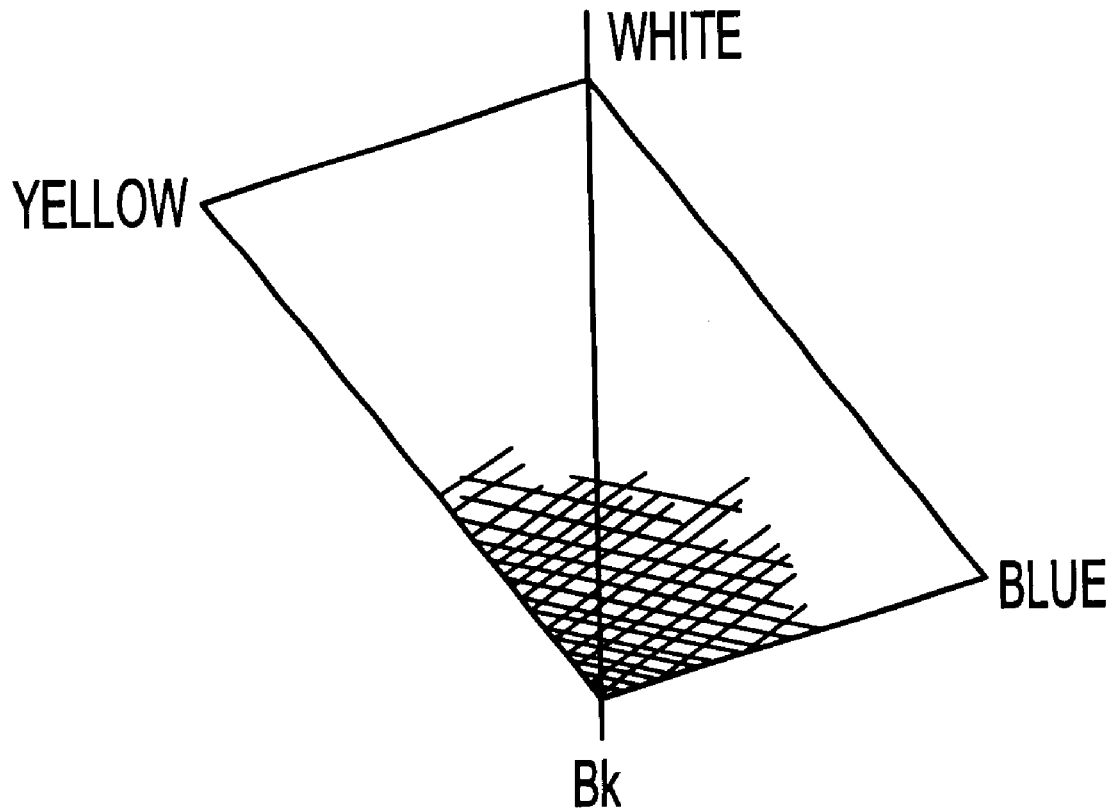
FIG. 5 is a view briefly showing a relationship between brightness index LS and a generation ratio of K as BGR in a two-dimensional color space.

In these formulas, pow($\alpha$,$\beta$) represents the $\beta$ power of $\alpha$, so that a slope is an adjusting parameter of the curve. FIG. 4 represents the generation ratio BGR and the index of brightness LS having the above-mentioned relationship, and FIG. 5 briefly shows this relationship in the two-dimensional space.

Although the generation ratio of K (BGR) is obtained from the relationship among the formulas (1) to (3) in the embodiment of the present invention, it is not limited to these related formulas. In other words, it should be noted that the basic precondition may be maintained, this precondition being such that the brighter the data before conversion becomes, the more the generation amount of K (Kout) decreases. Accordingly, it is possible that the relationship is the one where the generation ratio BGR is kept constant in the predetermined amount area or that the BGR is varied with respect to the characteristics of the curve (power function) in the varying area. For example, it may be varied according to the above-mentioned power function within the range from the minimum value to the maximum value of the index of brightness LS, or it is possible to utilize y function for the curve formed upon gradually varying.

Further, the element of the chroma T is added to the index of brightness in the embodiment of the present invention. By this, the index of brightness LS is made small in the area of the small chroma T as well as is made large in the area of the large chroma T. As a result, the generation ratio of K (BGR) increases when the chroma T is small to thereby provide characteristics such that the generation amount of K (Kout) increases in the area in the vicinity of gray. These characteristics mean that the generation amount of K (Kout) is caused to be increased to make it easy to keep a gray balance except for the bright color area. It is desirable to obtain these effects in the ordinary state, but it is possible not to suitably adopt the aforesaid addition of chroma T to the index of brightness in accordance with the demand for decreasing the color difference.

In a fourth step ST4, the generation amount of K (Kout) is determined based upon the aforesaid undercolor value CMYmin and the generation ratio BGR.

$$Kout = CMYmin * BGR$$

In this case, the product of the undercolor value CMYmin and the generation ratio BGR is utilized. However, the calculation may suitably be changed. In other words, the generation ratio BGR is only utilized to finally realize the effect such that the brighter the data before conversion becomes, the more the generation amount of K (Kout) decreases.

In a fifth step ST5, an undercolor removal amount UCR is determined as follows in order to decrease each component of CMY in accordance with the generation of K.

$$UCR = K * KC$$

The mark kc is a parameter for determining the UCR amount from the generation amount of K. Normally, this parameter is [0.0] to [1.0]. The greater the parameter becomes, the more the amount of CMY decreases.

In a sixth step ST6, each component of CMY such as Cout, Mout, Yout after the conversion is determined by subtracting the obtained undercolor removal amount UCR from each of the component of CMY.

Cout=C−UCR

Mout=M−UCR

Yout=Y−UCR

Figure 6:
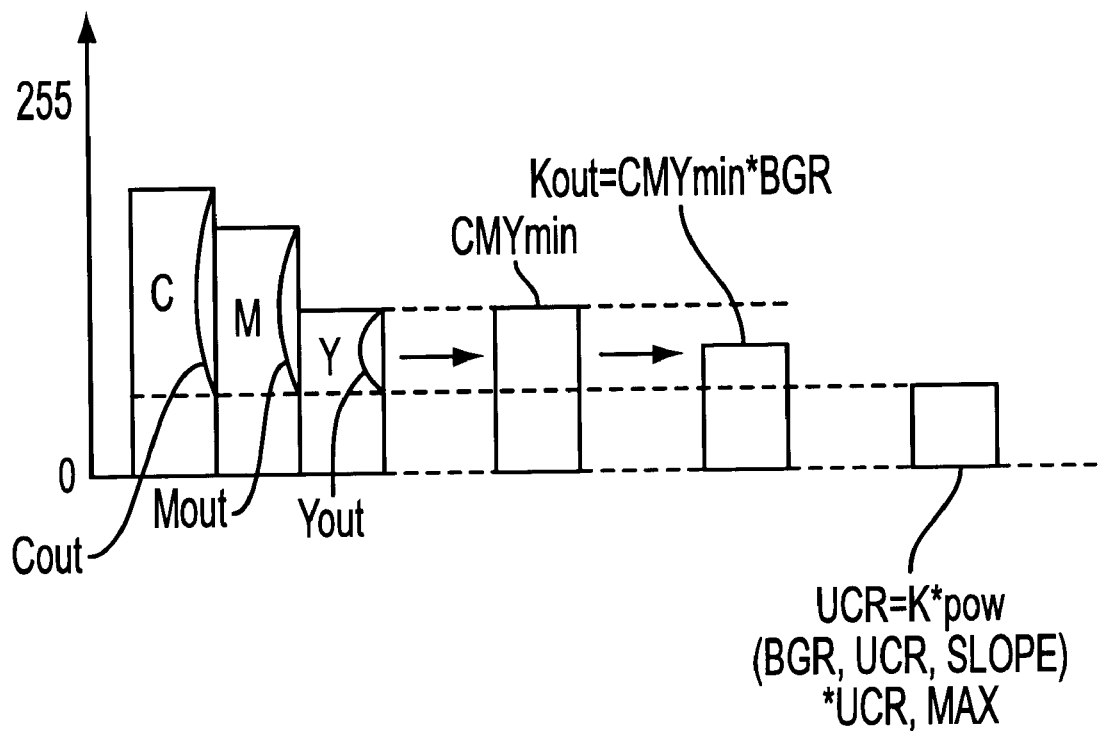
FIG. 6 is a view briefly showing a state wherein a component after conversion is obtained from a component before conversion.

As described above, the generation amount of K (Kout) as well as each component Cout, Mout, Yout of CMY after the conversion are obtained based upon each combination of CMY. FIG. 6 is a graph showing the conversion process as described above.

Figure 7:
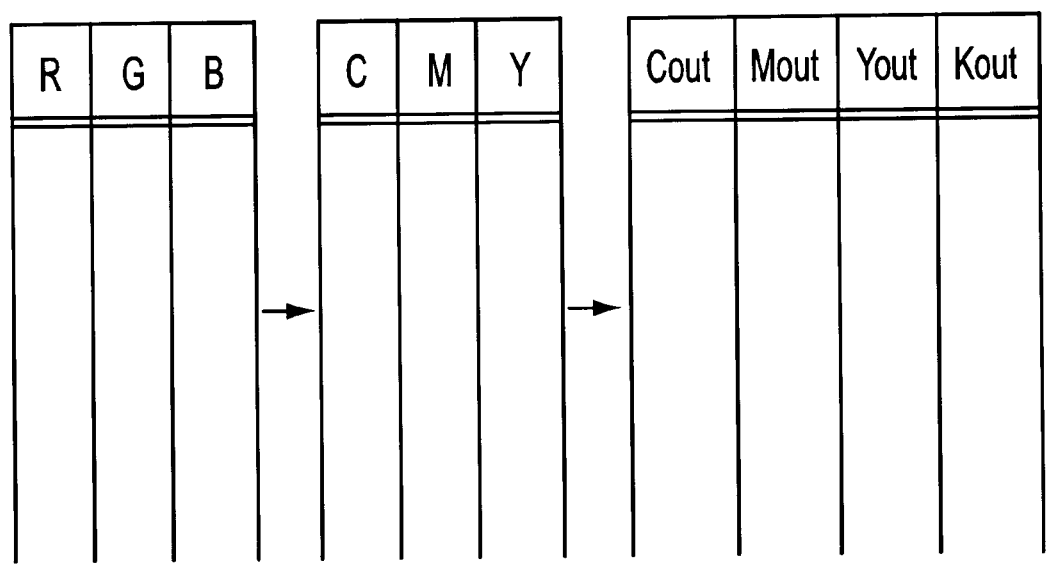
FIG. 7 is a view showing a conversion procedure of color conversion.
Figure 8:
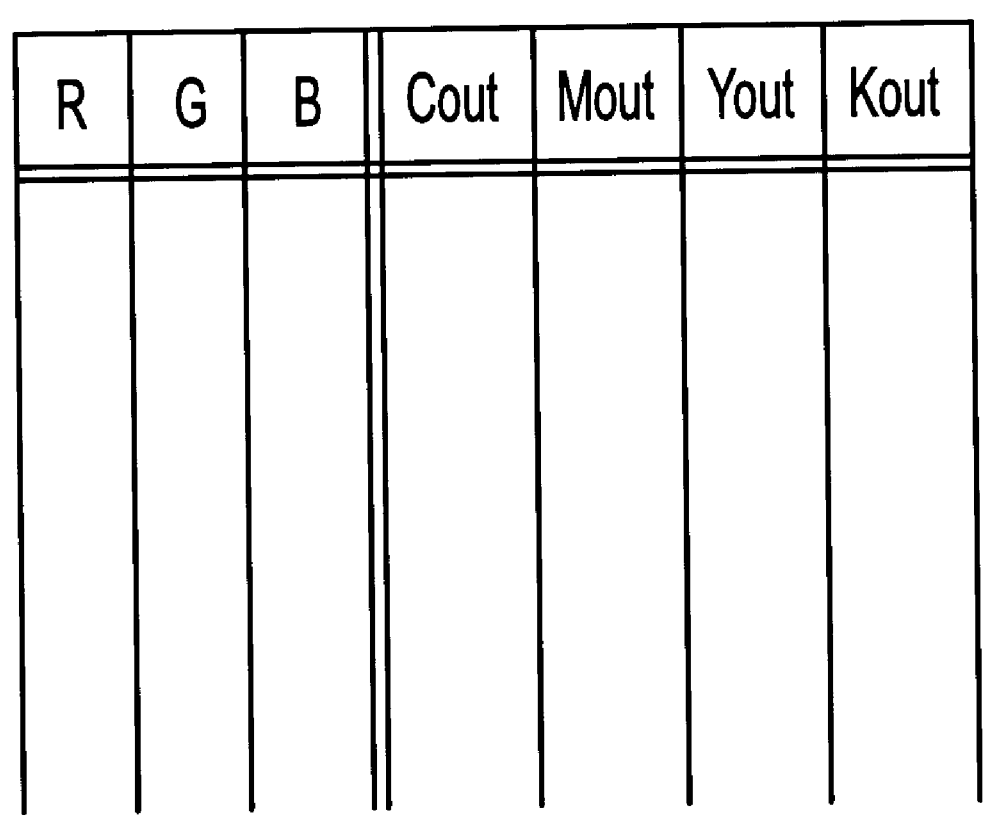

This conversion relationship should be recorded as a color conversion table for printing shown in FIG. 7. It should be noted that it becomes the CMY data at printing operation, while the original input data is not the CMY data. For example, it is ordinarily RGB data for taking tone color data in the case of image processing or image printing by a computer. Accordingly, two-step color conversion is necessary at the printing stage such that the color conversion from RGB to CMY is firstly performed and then the color conversion from CMY to Cout, Mout, Yout is performed. FIG. 8 shows a color conversion table for printing in order to simultaneously execute this two-step color conversion. Detailedly, CMY is obtained by performing the color conversion from RGB to CMY when the input data is RGB. Thereafter, the color conversion from CMY to Cout, Mout, Yout is performed. The obtained Cout, Mout, Yout are recorded with RGB to remake the color conversion table. In this way, the color conversion table for printing for performing black printing can be formed not only in the case where the input data is RGB but also in the case of other various color spaces.

Figure 9:
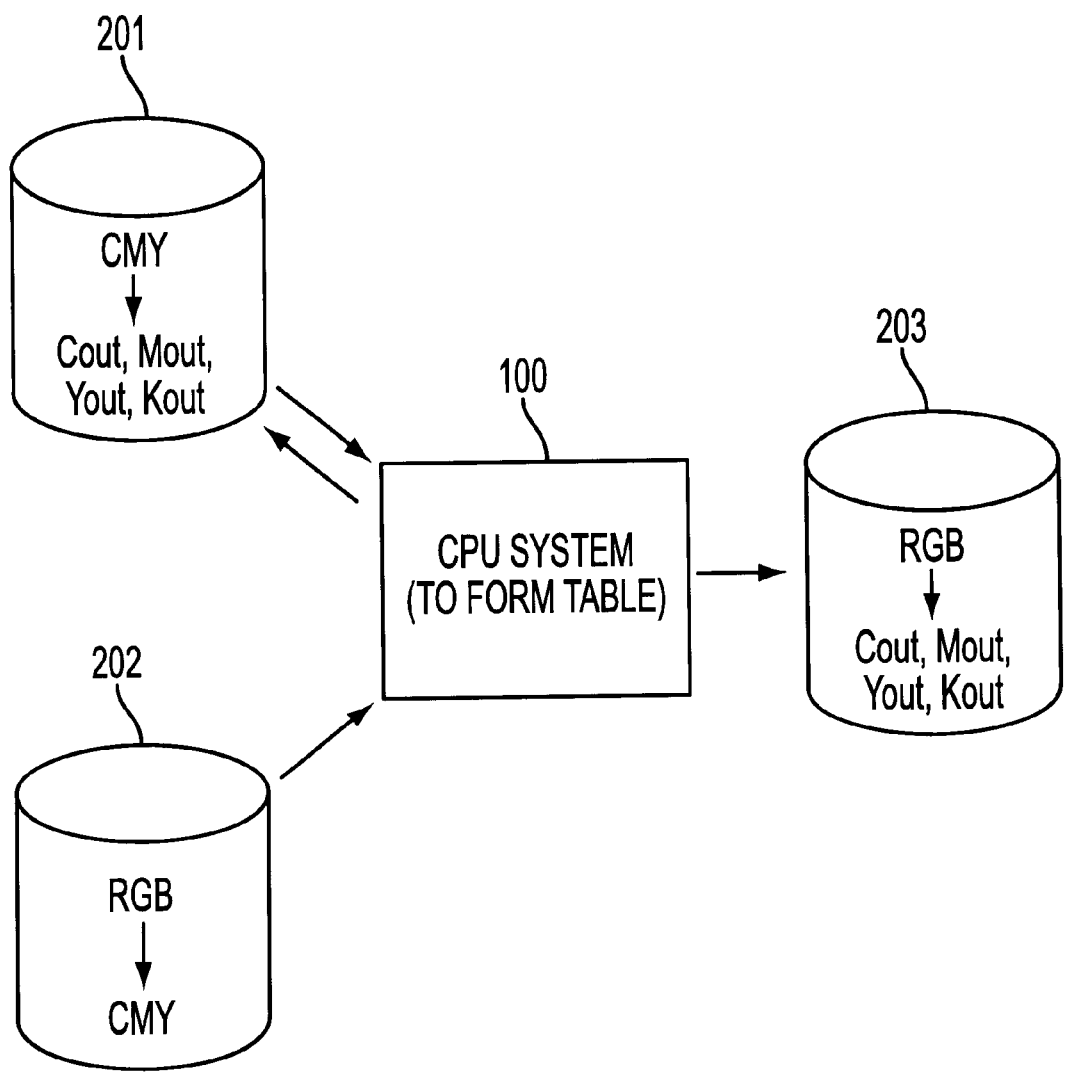
FIG. 9 is a view showing a computer system for forming a color conversion table for printing.

Subsequently, a computer system as one example for realizing the above-mentioned black color generation amount determining method is explained with reference to FIG. 9. FIG. 9 shows a process for making the color conversion table for printing shown in FIG. 8 by a computer system. The computer system comprises a CPU system 100 for performing calculation process and disc systems 201 to 203 for reading and writing various data files. The CPU system 100 comprises a main calculation device, display device, input device, secondary storing device and so on, while the disc systems 201 to 203 comprise an external storing device which is a portion of the secondary storing device. A conversion program which is executed by the CPU system 100 is stored in the secondary storing device and the like, whereby it is recorded in the secondary storing device via floppy disc or CD-ROM or communication line by a known method.

In such a construction, the CPU system 100 is a means for executing the aforesaid first step ST1 to the sixth step ST6 to form the color conversion table from CMY to Cout, Mout, Yout on the first disc system 201. Subsequently, the CPU system 100 forms the color conversion table for printing from RGB to Cout, Mout, Yout on the third disc system 203 by matching the recorded color conversion table from RGB to CMY with the color conversion table formed on the first disc system 201.

The computer system as described above can be realized in various computers such as from a computer of a personal computer class to a large-sized computer system.

Figure 10:
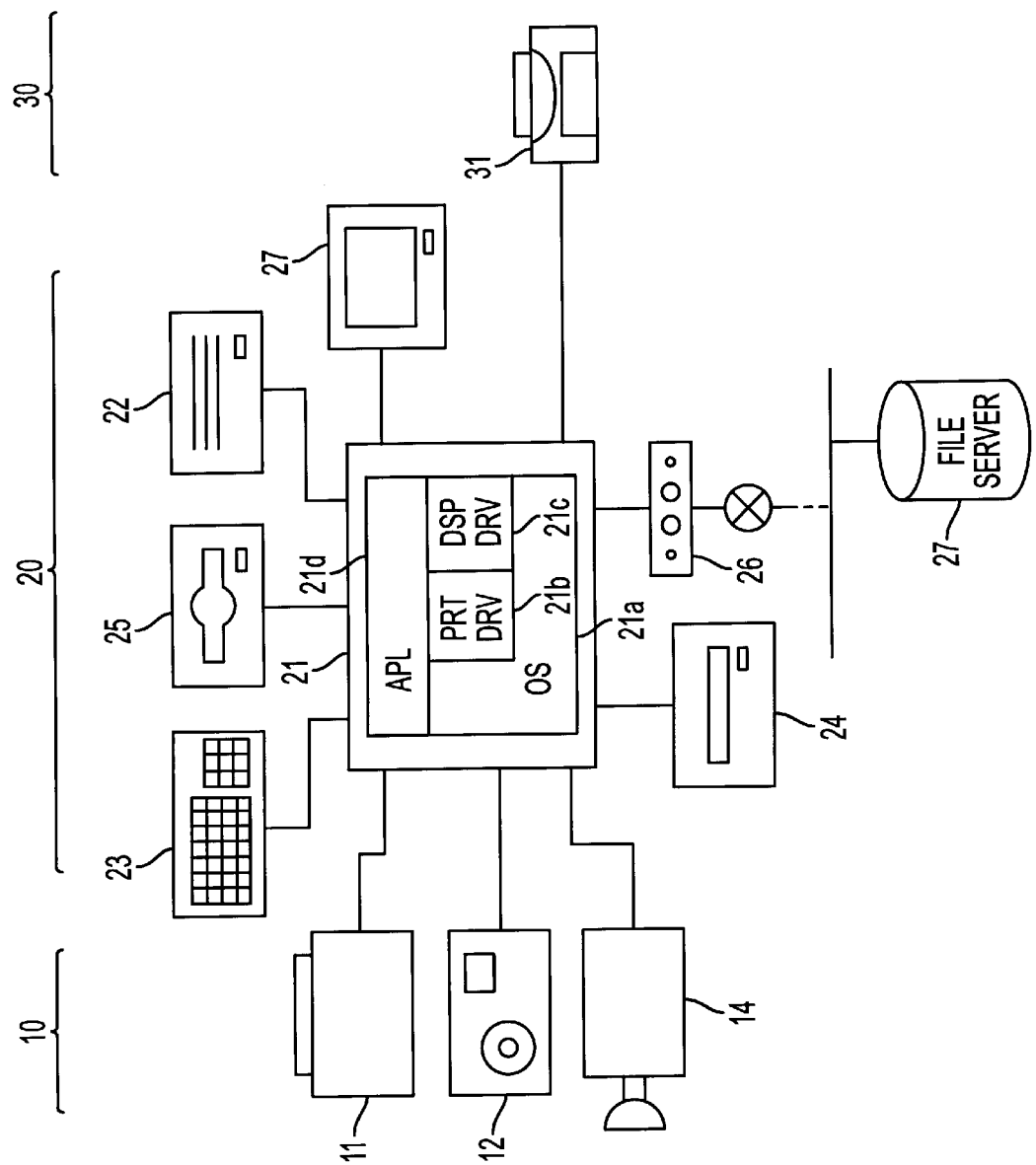
FIG. 10 is a schematic block diagram showing an image processing printing system for executing color conversion by using a color conversion table for printing.

FIG. 10 shows one example of an image processing printing system for actually performing a printing operation by using the color conversion table for printing formed as described above. In the image processing printing system, an image input device 10 inputs tone color data with respect to a color image to an image processing device 20 which performs image-processing operation to the tone color data to output to an image output device 30. In this case, the image processing device 20 outputs the tone color data for displaying and the print data for printing, so that the aforesaid color conversion table for printing is used for making the print data.

Specific examples of the image input device 10 include a scanner 11, digital still camera 12 or a video camera 14, while specific examples of the image processing device 20 include a computer system comprising a computer 21, hard disc 22, keyboard 23, CD-ROM drive 24, floppy disc drive 25, modem 26, and the like. Specific examples of the image output device 31 include a printer 31, display 32 or the like. The modem 26 can be introduced such that it is connected to a public communication line for connecting to a file server 27 of an external network to download the software or data.

The scanner 11 or the digital still camera 12 as the image input device 10 divides the image into pixels of dot matrix type as well as outputs tone color data of RGB 256 tones as the image data with respect to each pixel. The printer 31 as the image output device 30 requires binary tone color data of CMYK as the input. Accordingly, the tone color data of 256 tones is inputted to perform a predetermined image processing and printing operation to be outputted as the binary color data in the computer 21 as the image processing device 20. Operated in the computer 21 is an operating system 21a into which a printer driver 21b corresponding to the printer 31 and a display driver 21c corresponding to the display 32 are incorporated. An application driver 21d is controlled to perform the processing by the operating system 21a, and executes the display on the display 32 in cooperation with the display driver 21c as well as executes the printing operation in cooperation with the printer driver 21b depending on the situation.

It is the case where the print data is formed to the printer 31 as the image output device 30 that the color conversion table for printing is applied. Explained hereinafter is the printer 31 in which this print data is effectively applied.

Figure 11:
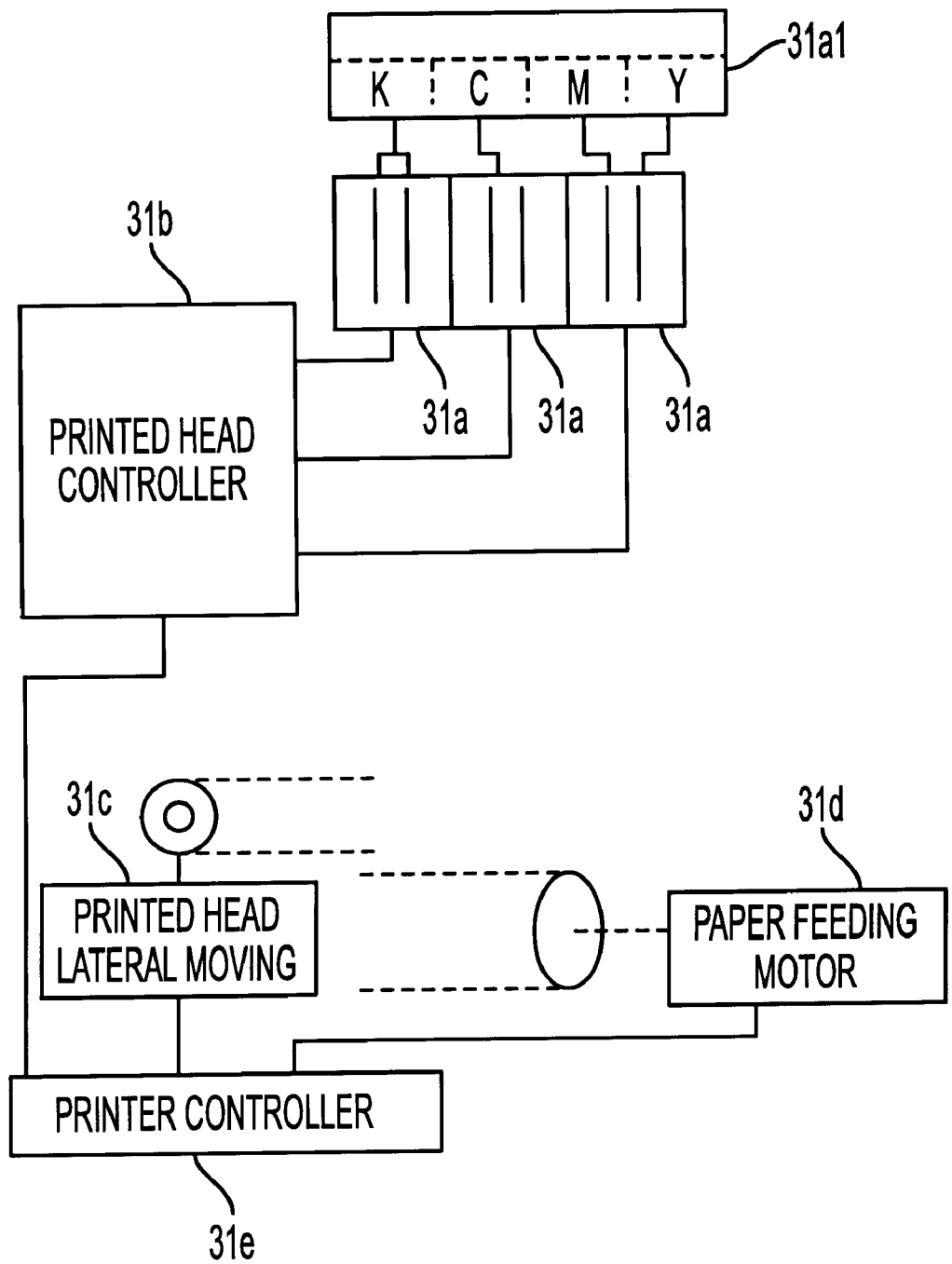
FIG. 11 is a block diagram of a printer.

FIG. 11 shows a schematic construction of the printer 31 which is provided with a dot printing mechanism comprising a print head 31a provided with three print head units, a print head controller 31b for controlling the print head 31a, a print head lateral moving motor 31c for laterally moving the print head 31a, a paper feed motor 31d for feeding a print paper in the longitudinal direction and a printer controller 31e serving as an interface to an external apparatus in the print head controller 31b, print head lateral moving motor 31c and the paper feed motor 31d, wherein the image printing operation can be performed in accordance with the print data.

Figure 12:
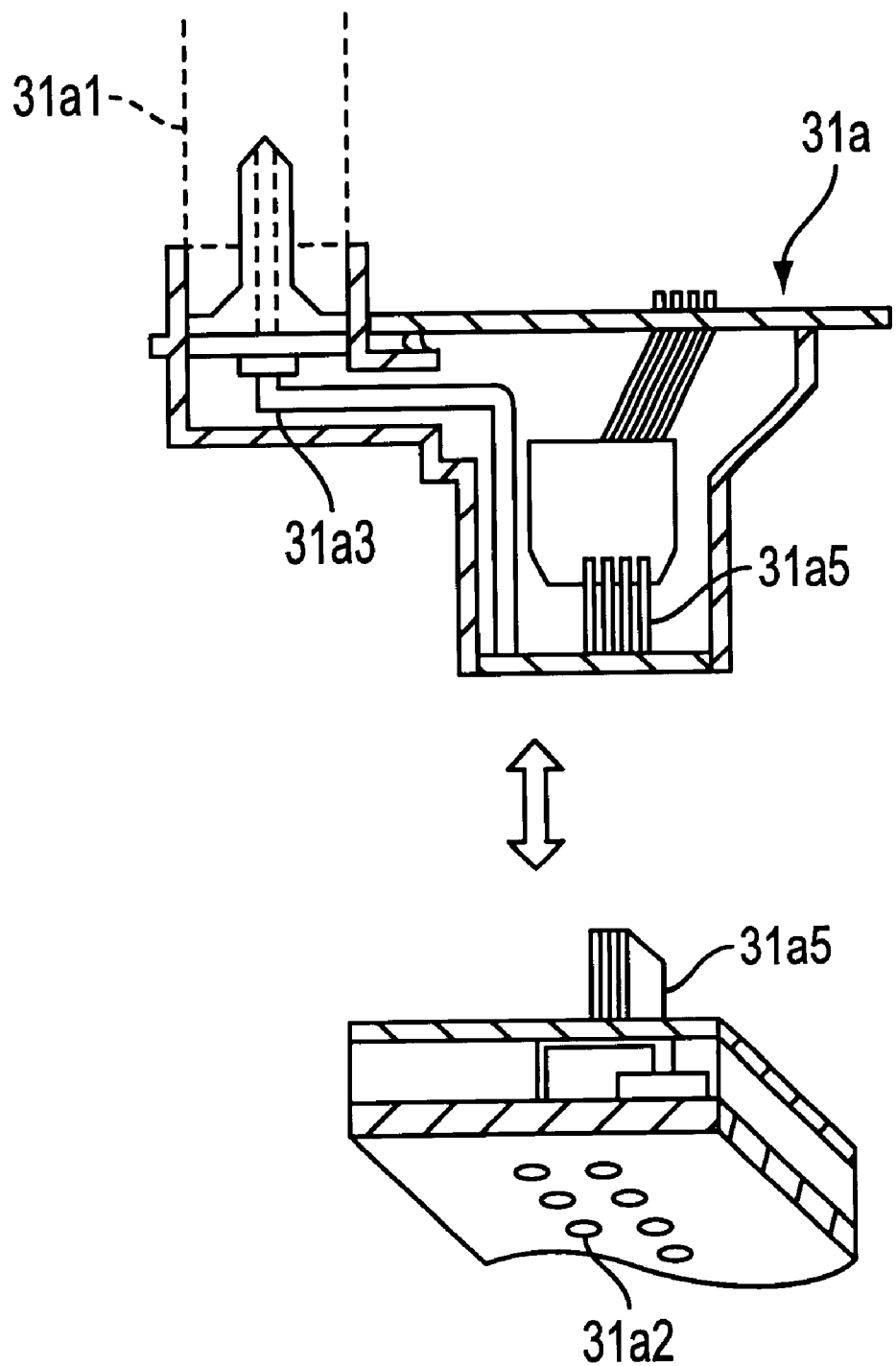
FIG. 12 is a schematic explanatory view showing in more detail a print head unit of the printer.
Figure 13:
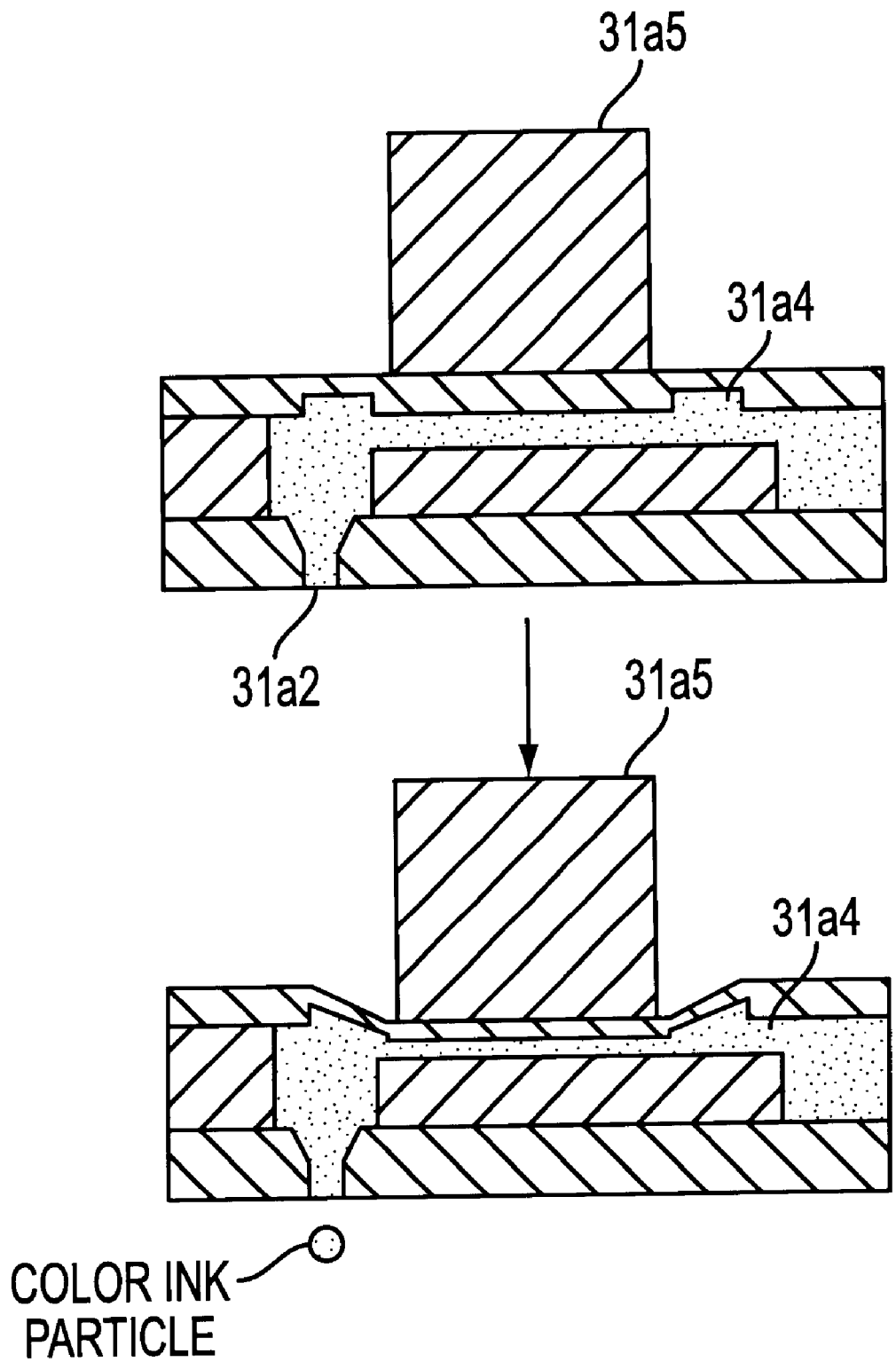
FIG. 13 is a schematic explanatory view showing a state wherein color ink is ejected by the print head unit.

FIG. 12 shows a more specific construction of the print head 31a. FIG. 13 shows the operation upon ejecting ink. Provided at the print head 31a is a minute tube path 31a3 extending from a color ink tank 31a1 to a nozzle 31a2. An ink chamber 31a4 is formed at the end portion of the tube path 31a3. The wall surface of the ink chamber 31a4 which is made of a flexible material is provided with a piezo-element 31a5 which is an electrostriction element. The piezo-element 31a5 deforms the crystal structure by applying a voltage to perform high-speed electromechanical energy conversion. The wall surface of the ink chamber 31a4 is pushed by the deformation of the crystal structure, thereby decreasing the capacity of the ink chamber 31a4. As a result, color ink particles of a predetermined amount are gushed out from the nozzle 31a2 going through the ink chamber 31a4. This pump structure is referred to as a micropump mechanism.

Formed at a single print head unit are independent two nozzle lines 31a2, each of which is independently supplied with color ink. In this example, two lines in the left hand print head unit are used for black ink, single line in the center print head unit is for cyan ink and two lines in the right hand print head unit for magenta and yellow respectively. In this way, color ink particles are ejected from each nozzle 31a2 by using cyan ink, magenta ink, yellow ink and black ink to reproduce a color image of dot matrix type. The dots are originally ejected here on the assumption that dots of three colors are overlapped with one another with a predetermined areal ratio as shown in FIG. 3. Based upon this assumption, black color component is added to perform printing operation by the aforesaid process.

In the embodiment of the present invention, the printer 31 of ink jet type adopting the micropump mechanism is explained. However, the embodiment of the present invention is applicable to a printer having another color printing mechanism if black printing can be realized. Examples of such a printer include a color printer adopting a pump mechanism of a bubble jet type or an electrostatic color printer. In addition, the present invention is not limited to a printer having a computer system incorporated between the image input device 10 and the image output device 30 to perform printing operation, while it is applicable to a printer in which tone color data is inputted without a computer system to perform printing operation.

Figure 14:
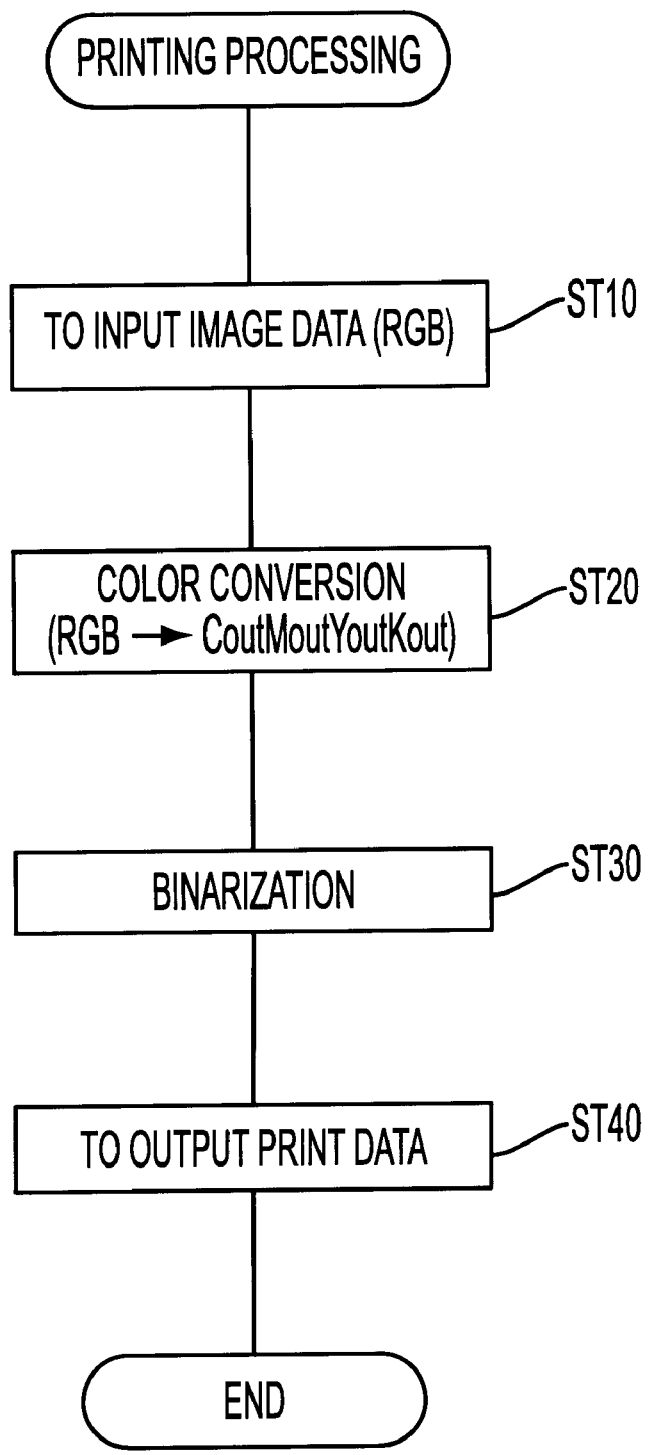
FIG. 14 is a flowchart showing a printing procedure executed in an image processing printing system

FIG. 14 shows a flowchart when a printing processing is operated in the image processing printing system having the aforesaid construction. The printing processing starts from a condition where the printer driver 21b receives via the operating system 21a RGB tone color data of the dot matrix image outputted from the application 21d.

When receiving via the operating system 21a RGB tone color data of the dot matrix image in step ST10 as described above, the printer driver 21b performs color conversion from RGB to CMYK with reference to the aforesaid color conversion table for printing. It is not always necessary for the color conversion table for printing to possess a conversion result as to all of the colors consisting of combinations of RGB. If there is no corresponding conversion value, the conversion result may be obtained by performing an interpolation calculation. Further, it may occur that the tone conversion is firstly performed corresponding in number to tones of the color conversion table for printing based upon the consideration that the color conversion table for printing has less tone number compared to the data before conversion, whereupon the color conversion table for printing is referred after the tone conversion. In the tone conversion in this case, it is necessary to utilize an error diffusion method to prevent color difference from making great.

To obtain by referring to the color conversion table for printing are Cout, Mout, Yout, Kout as described above. In this conversion result, the generation amount of K varies in accordance with brightness even if the undercolor value CMYmin is the same. There is a tendency that the brighter the color is, the more the generation of K decreases.

The condition that the color conversion table for printing is referred to means that the color conversion is only performed. Therefore, it is necessary to convert the color conversion into binary tone data which can be inputted by the printer 31. In step ST30, binarization called halftone procedure is executed. The error diffusion method or dither method is used in the procedure of binarization to perform tone conversion from the tone color data of CMYK 256 tones to binary tones.

In step ST40, the binarized print data is outputted to the printer 31. The print data is received by the printer controller 31e of the printer 31. The printer controller 31e relatively scans the print head 31a on the paper to eject particulate color ink from each nozzle 31a2. As described above, the generation amount of K is made small with respect to the brighter color when RGB tone color data is color-converted. Further, dot of the black color component appear only in the dark area as a result of the observation on the paper, thereby not so remarkable. Moreover, the index of brightness LS includes the element of the chroma T, rendering the index of brightness LS great in general. As a result, the generation amount of K (Kout) increases in the area of low chroma T, whereby the gray balance is easy to be kept by increasing the black color component.

Subsequently, an operation of the embodiment of the present invention having the aforesaid construction will be explained.

Assuming that the tone color data read by the scanner 11 is printed by the printer 31, the application 21d is firstly operated with the operating system 21a being operated in the computer 21, to thereby cause the scanner 11 to start reading out. When the read tone color data is received by the application 21d via the operating system 21a, a predetermined image processing is performed to select printing processing.

When the printing processing is selected, the operating system 21a operates the printer driver 21b. The printer driver 21b inputs the RGB tone color data as the image data at step ST10, refers the color conversion table for printing having the structure shown in FIG. 8 from the RGB tone value at step ST20 and obtains Cout, Mout, Yout, Kout as the conversion result. Thereafter, the binarization is performed at step ST30, whereby the binary tone CMYK data is outputted to the printer 31 at step ST40.

The printer 31 not only obtains the CMY tone color data having color components with respect to the RGB tone color data but also performs black printing including black color component. In this case, the conversion is executed not from the viewpoint of color difference but from the viewpoint of unremarkableness of dot, whereby dot of K is unremarkable. For example, in the case of the former example of C:200, M:200, Y:50 which means the components of cyan and magenta are greatly included, the brightness index L* obtained via three stimulus values X, Y, Z is low, so that the index of brightness LS is small even if the element of the chroma T calculated via the chromaticness index a*b* is added. As a result, the generation ratio of K (BGR) becomes approximately 1.0. On the other hand, in the case of C:50, M:50, Y:200 having the same undercolor value CMYmin as the former example, the brightness index L* obtained via the three stimulus values X, Y, Z becomes high, so that the index of brightness LS is large. As a result, the generation ratio of K (BGR) becomes approximately 0.0. Accordingly, the generation amount of K decreases when the brighter color is used in the present invention to thereby render the K dot unremarkable in black printing including the black color component, while the same amounts of K components are conventionally generated in the case of the same undercolor value.

In this way, for performing black printing in a color space for printing comprising a plurality of approximately equivalent element colors such as CMY, the CPU system 100 multiplies the undercolor amount CMYmin which is a common minimum component in the above-mentioned plurality of element colors by the predetermined generation ratio BGR to generate a black color component. In this case, the generation ratio BGR of the black color component decreases as the data before conversion becomes brighter, whereby the generation amount Kout of the black color component is small for the brighter color if the undercolor amount CMYmin is the same. When the printing operation is performed with reference to the color conversion table for printing obtained in this way, dot corresponding to the black color component is unremarkable.

I claim:

1. A black color generation amount determining method in black printing for generating a black color component in order to perform black printing in a color space for printing comprising a plurality of approximately equivalent elementary colors, comprising the steps of:
   calculating a brightness value of data, expressing an intensity of light;
   determining a gray component in said plurality of colors;
   determining a black color generation ratio, the value of said black color generation ratio varying inversely with said brightness value of said data; and
   determining a black color generation amount by modifying said gray component according to said black color generation ratio.

2. The black color generation amount determining method in black printing as claimed in claim 1, further comprising determining said gray component based upon an undercolor amount, said undercolor amount being a common minimum component in said plurality of elementary colors.

3. The black color generation amount determining method in black printing as claimed in claim 1, wherein said step of calculating said brightness value is performed with reference to chroma.

4. The black color generation amount determining method in black printing as claimed in claim 1, wherein said step of calculating said brightness value is performed with reference to a table indicating a predefined correspondence relationship between the brightness value and the data.

5. The black color generation amount determining method in black printing as claimed in claim 1, further comprising determining the generation amount of the black color component in the color space for printing based upon color data comprising a coordinate value of a color space different from said color space for printing.

6. The black color generation amount determining method in black printing as claimed in claim 1, further comprising using a color conversion table for converting to said color space for printing from a different color space, and wherein said color conversion table includes said determined black color component generation amount.

7. The black color generation amount determining method in black printing as claimed in claim 1, further comprising:
   obtaining an undercolor value from data color components, said undercolor value being a common minimum component in said plurality of elementary colors;
   calculating chroma of said data;
   determining said black color generation ratio from said brightness value and chroma; and
   determining said black color generation amount based upon said undercolor value and said black color generation ratio.

8. A black color generation amount determining method in black printing for generating a black color component in order to perform black printing in a color space for printing comprising a plurality of approximately equivalent elementary colors, comprising the steps of:
   calculating a brightness value of data; and
   determining a black color component generation amount in accordance with a gray component in said plurality of elementary colors, and said calculated brightness value;
   wherein said black color generation amount varies inversely with said calculated brightness value; and
   wherein said step of calculating said brightness value is performed with three stimulus values obtained from the Neugebauer equation, and by a linear conversion of said three stimulus values.

9. A black color generation amount determining apparatus generating a black color component used to perform black printing in a color space comprising a plurality of approximately equivalent elementary colors, comprising:
   means for calculating a brightness value of data, expressing an intensity of light;
   means for determining a gray component in said plurality of colors;
   means for determining a black color generation ratio, the value of said black color generation ratio varying inversely with said brightness value of said data; and
   means for determining a black color generation amount by modifying said gray component according to said black color generation ratio.

10. The black color generation amount determining apparatus as claimed in claim 9, further comprising means for determining said gray component based upon an undercolor amount, said undercolor amount being a common minimum component in said plurality of elementary colors.

11. The black color generation amount determining apparatus as claimed in claim 9, wherein said calculating of said brightness value is performed with reference to chroma.

12. The black color generation amount determining apparatus as claimed in claim 9, wherein said calculating of said brightness value is performed with reference to a table indicating a predefined correspondence relationship between the brightness value and the data.

13. The black color generation amount determining apparatus as claimed in claim 9, further comprising means for determining the generation amount of the black color component in the color space for printing based upon color data comprising a coordinate value of a color space different from said color space for printing.

14. The black color generation amount determining apparatus as claimed in claim 9, further comprising a color conversion table for converting to said color space from a different color space, and wherein said color conversion table includes said determined black color component generation amount.

15. A computer readable medium with a black color generation program, said program being adapted to enable a computer to determine a generation amount of a black color component in order to perform black printing in a color space comprising a plurality of approximately equivalent elementary colors, said program performing the steps of:
   calculating a brightness value of data, expressing an intensity of light;
   determining a gray component in said plurality of colors;
   determining a black color generation ratio, the value of said black color generation ratio varying inversely with said brightness value of said data; and determining a black color generation amount by modifying said gray component according to said black color generation ratio.

16. The computer readable medium with a black color generation program as claimed in claim 15, said program further performing the step of determining said gray component based upon an undercolor amount, said undercolor amount being a common minimum component in said plurality of elementary colors.

17. The computer readable medium with a black color generation program as claimed in claim 15, wherein said calculating of said brightness value is performed with reference to chroma.

18. The computer readable medium with a black color generation program as claimed in claim 15, wherein said calculating of said brightness value is performed with reference to a table indicating a predefined correspondence relationship between the brightness value and the data.

19. The computer readable medium with a black color generation program as claimed in claim 15, said program further comprising a step of determining the generation amount of the black color component in the color space for printing based upon color data comprising a coordinate value of a color space different from said color space for printing.

20. The computer readable medium with a black color generation program as claimed in claim 15, said program further comprising a color conversion table for converting to said color space from a different color space, and wherein said color conversion table includes said determined black color component generation amount.

21. The computer readable medium with a black color generation program as claimed in claim 15, said program further comprising the steps of:
  obtaining an undercolor value from data color components, said undercolor value being a common minimum component in said plurality of elementary colors;
  calculating chroma of said data;
  determining black color generation ratio from said brightness value and chroma; and
  determining said black color generation amount based upon said undercolor value and said black color generation ratio.

22. A black color generation amount determining apparatus generating a black color component used to perform black printing in a color space comprising a plurality of approximately equivalent elementary colors, comprising:
  means for calculating a brightness value of data; and
  means for determining a black color component generation amount in accordance with a gray component in said plurality of elementary colors, and said calculated brightness value;
  wherein said black color generation amount varies inversely with said calculated brightness value; and
  wherein said calculating of said brightness value is performed with three stimulus values obtained from the Neugebauer equation, and by a linear conversion of said three stimulus values.

23. The black color generation amount determining apparatus as claimed in claim 9, further comprising:
  means for obtaining an undercolor value from data color components, said undercolor value being a common minimum component in said plurality of elementary colors;
  means for calculating chroma of said data;
  means for determining said black color generation ratio from said brightness value and chroma; and
  means for determining said black color generation amount based upon said undercolor value and said black color generation ratio.

24. A computer readable medium with a black color generation program, said program being adapted to enable a computer to determine a generation amount of a black color component in order to perform black printing in a color space comprising a plurality of approximately equivalent elementary colors, said program performing the steps of:
  calculating a brightness value of data; and
  determining a black color component generation amount in accordance with a gray component in said plurality of elementary colors, and the calculated brightness value;
  wherein said black color generation amount varies inversely with said calculated brightness value; and
  wherein said calculating of said brightness value is performed with three stimulus values obtained from the Neugebauer equation, and by a linear conversion of said three stimulus values.

25. An image processor for calculating a black color generation amount in black printing in order to perform black printing in a color space for printing a plurality of approximately equivalent element colors, comprising:
  a computer; and
  a printer driver for generating said black color component from image data by:
    calculating a brightness value of data, expressing an intensity of light;
    determining a gray component in said plurality of colors;
    determining a black color generation ratio, the value of said black color generation ratio varying inversely with said brightness value of said data; and
    determining a black color generation amount by modifying said gray component according to said black color generation ratio.

* * * * *